(12) United States Patent
Zhang et al.

(10) Patent No.: US 11,978,566 B2
(45) Date of Patent: May 7, 2024

(54) UNLOADING DEVICE

(71) Applicant: Tsinghua University, Beijing (CN)

(72) Inventors: Haiquan Zhang, Beijing (CN); Zuoyi Zhang, Beijing (CN); Junfeng Nie, Beijing (CN); Hongke Li, Beijing (CN); Xin Wang, Beijing (CN); Jiguo Liu, Beijing (CN); Yujie Dong, Beijing (CN)

(73) Assignee: CHINERGY CO., LTD. (CN)

( * ) Notice: Subject to any disclaimer, the term of this patent is extended or adjusted under 35 U.S.C. 154(b) by 797 days.

(21) Appl. No.: 17/045,076

(22) PCT Filed: Jul. 31, 2019

(86) PCT No.: PCT/CN2019/098591
§ 371 (c)(1),
(2) Date: Oct. 2, 2020

(87) PCT Pub. No.: WO2020/134074
PCT Pub. Date: Jul. 2, 2020

(65) Prior Publication Data
US 2021/0151210 A1    May 20, 2021

(30) Foreign Application Priority Data
Dec. 29, 2018 (CN) .......................... 201811633899.5

(51) Int. Cl.
*G21C 19/02*  (2006.01)
*B65G 65/48*  (2006.01)
*G21C 19/20*  (2006.01)

(52) U.S. Cl.
CPC ....... *G21C 19/202* (2013.01); *B65G 65/4818* (2013.01); *B65G 2201/0214* (2013.01)

(58) Field of Classification Search
CPC ...... G21C 19/14; G21C 19/19; G21C 19/202; B65G 65/4818; B65G 65/4836
See application file for complete search history.

(56) References Cited

U.S. PATENT DOCUMENTS

| 4,058,671 A | 11/1977 | Panek et al. |
| 11,488,734 B2 | 11/2022 | Yan et al. |

(Continued)

FOREIGN PATENT DOCUMENTS

| CN | 1666087 A | 9/2005 |
| CN | 101324498 A | 12/2008 |

(Continued)

OTHER PUBLICATIONS

Extended European Search Report, EP Application No. 19905652.4, dated Dec. 17, 2021, 7 pages, EPO.

(Continued)

*Primary Examiner* — J C Jacyna
(74) *Attorney, Agent, or Firm* — Jaffery Watson Mendonsa & Hamilton LLP

(57) ABSTRACT

The present application relates to the field of mechanical engineering technologies, and particularly to an unloading device. The unloading device includes a power mechanism, a transmission mechanism, and an execution mechanism that are connected in sequence from top to bottom; wherein the execution mechanism includes a shafting assembly and a turntable assembly that are connected in sequence from top to bottom; wherein the turntable assembly includes an upper auxiliary fence, a middle main disturbance disk, and a lower reclaiming portion that are arranged in sequence from top to bottom. The unloading device provided by the present application is easy to control, and ensures the reclaiming reliability of the spherical materials and the stability of the sphere flow unloading, which can meet the requirements of long life and reliable operation of the unloading device (Continued)

under light load and low speed working conditions and achieve the convenient maintenance.

8 Claims, 5 Drawing Sheets

(56) References Cited

U.S. PATENT DOCUMENTS

| | | | |
|---|---|---|---|
| 2006/0006189 A1 | 1/2006 | Curtolo et al. | |
| 2021/0249148 A1 | 8/2021 | Yan et al. | |
| 2021/0296014 A1* | 9/2021 | Zhang | G21C 17/06 |

FOREIGN PATENT DOCUMENTS

| | | | | |
|---|---|---|---|---|
| CN | 101770825 A | | 7/2010 | |
| CN | 202221488 U | | 5/2012 | |
| CN | 202221489 U | | 5/2012 | |
| CN | 102855951 A | | 1/2013 | |
| CN | 102881343 A | | 1/2013 | |
| CN | 102982855 | * | 3/2013 | Y02E 30/30 |
| CN | 202939981 U | | 5/2013 | |
| CN | 103708728 A | | 4/2014 | |
| CN | 203529425 U | | 4/2014 | |
| CN | 103971772 A | | 8/2014 | |
| CN | 102982855 B | | 4/2015 | |
| CN | 205289018 A | | 6/2016 | |
| CN | 205289018 U | | 6/2016 | |
| CN | 105845186 A | | 8/2016 | |
| CN | 107817061 A | | 3/2018 | |
| CN | 107851467 A | | 3/2018 | |
| CN | 207844404 U | | 9/2018 | |
| CN | 108706335 A | | 10/2018 | |
| CN | 108831571 A | | 11/2018 | |
| CN | 109607240 A | | 4/2019 | |
| CN | 109616235 A | | 4/2019 | |
| EP | 0506183 A1 | | 9/1992 | |
| EP | 2727117 A1 | | 5/2014 | |
| EP | 2727117 | * | 7/2017 | G01C 19/202 |
| GB | 923546 A | | 4/1963 | |
| GB | 958439 A1 | | 5/1964 | |
| JP | 2007209102 A | | 8/2007 | |
| JP | 4152372 B2 | | 9/2008 | |
| JP | 2012041102 A | | 3/2012 | |
| KR | 20170090680 A | | 8/2017 | |
| WO | 0033034 A1 | | 6/2000 | |
| WO | 2014000553 A1 | | 1/2014 | |
| WO | 2020134074 A1 | | 7/2020 | |

OTHER PUBLICATIONS

Office Action, KR Application No. 10-2020-7015554 (P001PCT-KR), dated Dec. 18, 2021, 13 pages with English Translation, KIPO.
International Search Report and Written Opinion, PCT Application No. PCT/CN2019/098591, dated Oct. 23, 2019, pp. 1-8, CNIPA.
Fan Zhichun et al., "Stress Monitoring of Sealing Materials in Electrical Penetration Assemblies," 2018, pp. 1-8, ASME.
International Search Report, PCT Application No. PCT/CN2018/122019, dated Mar. 25, 2019, pp. 1-5, CNIPA.
Li Mingze et al., "Prestress Measurement During Glass-Metal Sealing Based on a Fiber Sensor," 2018, pp. 664-670, English Abstract (1—page), China Academic Journal Electronic Publishing House.
Li Mingze et al., "Residual Stress Measurement of Sealing Glass Based on Optical Fiber Sensing Technology," 2018, pp. 1-6, ASME.
Zhichun Fan et al., "Analysis of Residual Stress in Electrical Penetration Assembly Based on a Fiber Bragg Grating Sensor," Jan. 2019, pp. 1-12, vol. 19, Issue 1, MDPI.
Restriction Requirement for U.S. Appl. No. 17/254,552, dated Mar. 23, 2022, 7 pages, USPTO.
Non-Final Office Action for U.S. Appl. No. 17/254,552, dated Jun. 2, 2022, 16 pages, USPTO.
Notice of Allowance for U.S. Appl. No. 17/254,552, dated Aug. 3, 2022, 8 pages, USPTO.

* cited by examiner

UNLOADING DEVICE

CROSS-REFERENCE OF RELATED APPLICATION

The present application claims priority under 35 U.S.C. § 371 to International patent application No. PCT/CN2019/098591 filed on Jul. 31, 2019, entitled "UNLOADING DEVICE", which claims priority to Chinese Patent Application No. 201811633899.5, filed on Dec. 29, 2018, entitled "Unloading Device", which is incorporated herein by reference in its entirety.

FIELD OF TECHNOLOGY

The present application relates to the field of mechanical engineering technologies, and particularly to an unloading device.

BACKGROUND

Pebble bed high-temperature gas-cooled reactors achieve an on-line continuous operation by using the spherical element material to pass through the core multiple times. During the process of core element cycling, spent fuel unloading, new fuel loading, core reloading and etc., a core unloading device is needed to unload the spherical elements stacked in the core. The core unloading device is a typical isodiametric spherical material unloading device.

At present, there are two main core unloading processes for pebble bed high-temperature reactors. One is to unload using a single-row device, and the other is to unload using an integrated unloading device formed by a combination of a reclaiming singular device and a damage fuel separator to unload. Due to the pressure of the pebble bed, the structure of the stock bin and the inherent material characteristics of the spherical graphite element, the core unloading device of the pebble bed high-temperature reactor has two main technical requirements: one is the stability of reclaiming which meets the expected unloading efficiency; the other is to avoid arching and jamming of the stock bin to ensure the reclaiming reliability. The main problem when unloading is performed using a single-row device is that the unloading is unstable and it is difficult to cooperate with the downstream singular unloading equipment during the unloading operation since the number of the spherical elements in the outlet pipeline is random, and thus a singular unloading process control cannot be performed efficiently and reliably. When the unloading is performed using an integrated unloading device formed by a combination of a reclaiming singular device and a damage fuel separator, the tray of the reclaiming singular device and the roller of the damage fuel separator are heavy and have horizontal cantilever support structures, the bearings in the shafting are subjected to combined radial, axial and torsional loads, and the bearings face a severe test of long-life operation. In addition, it is extremely difficult to maintain a horizontal core unloading device with complex structure and its shafting under strong radioactivity, especially for the core unloading device, maintenance can only be carried out after the reactor is shut down and depressurized, and the radioactive atmosphere in the reactor is reliably and effectively isolated. Therefore, in terms of the availability of nuclear power plant and the protection of personnel, a high cost must be paid.

SUMMARY

(I) Technical Problem to be Solved

An objective of the present application is to provide an unloading device that can solve the problems of unstable unloading and poor maintainability of the existing isodiametric spherical material unloading device.

(II) Technical Solutions

In order to solve the technical problem above, the present application provides an unloading device, including a power mechanism, a transmission mechanism, and an execution mechanism that are connected in sequence from top to bottom; wherein the execution mechanism includes a shafting assembly and a turntable assembly that are connected in sequence from top to bottom; wherein the turntable assembly includes an upper auxiliary fence, a middle main disturbance disk, and a lower reclaiming portion that are arranged in sequence from top to bottom.

Further, a bottom of the turntable assembly is provided with a guard plate assembly.

Further, the guard plate assembly includes a bottom arc plate and an insert bar assembly provided on the bottom arc plate; the bottom arc plate is connected to a tapered surface chamber, and the insert bar assembly is arranged between the bottom arc plate and the tapered surface chamber.

Further, the insert bar assembly includes a gantry, two insert bars correspondingly and movably connected to left and right sides of the gantry respectively, and two side baffles symmetrically disposed on the left and right sides of the gantry; the gantry is provided with a reclaiming port.

Further, the lower reclaiming portion includes a reclaiming ring and an inner baffle ring provided in the reclaiming ring; the reclaiming ring includes a plurality of spacer ribs arranged annularly, and each of the spacer ribs is connected to the inner baffle ring; a reclaiming slot is formed between each adjacent two of the spacer ribs and the inner baffle ring.

Further, a plurality of disturbance blocks are provided on an outer side surface of the middle main disturbance disk.

Further, the upper auxiliary fence is formed by circular segments and tangent planes that are arranged at intervals.

Further, the shafting assembly includes a main shaft, a first bearing, a second bearing, a withdrawal bearing bush, and a thrust bearing; the first bearing and the second bearing are respectively installed on the main shaft from top to bottom; the first bearing and the second bearing are both arranged in the withdrawal bearing bush; the thrust bearing is mounted on the main shaft and arranged on an upper portion of the withdrawal bearing bush.

Further, the device further includes a pressure-bearing casing assembly; an upper end and a lower end of the transmission mechanism are detachably connected to the power mechanism and the execution mechanism respectively; a coupling support is arranged outside the transmission mechanism, and the coupling support is connected to a bearing sleeve connected to the pressure-bearing casing assembly.

Further, disturbance mechanisms are provided on the pressure-bearing casing assembly, and the disturbance mechanisms are linear reciprocating drive mechanisms.

(III) Advantageous Effects

The technical solutions above of the present application have the following advantages:

in the unloading device provided by the present application, the turntable assembly includes three functional sections of the upper auxiliary fence, the middle main disturbance disk, and the lower reclaiming portion that are arranged in sequence from top to bottom. The three functional sections can correspond to three-layer spherical materials pressed to the turntable assembly in the stock bin, and respectively perform the functions of two-direction disturbance in the upper layer, multi-direction disturbance in the middle layer, reclaiming and circumferential disturbance in the lower layers on the three-layer spherical materials, so that the spherical materials in the stock bin can be fully disturbed in the circumferential, radial and height directions, so as to achieve the adaptive and efficient reclaiming, which makes the unloading operation more stable and better maintainability.

In the unloading device provided by the present application, the guard plate assembly is provided with the insert bar assembly which connects two opposite insert bars on the left and right through the gantry. When the unloading device operates normally, the insert bars are opened so that the flow path of the bottom arc plate is smooth. When the turntable assembly needs to be maintained with materials, the two insert bars can be manually inserted to close the flow path of the bottom arc plate, so as to block the spherical materials in the stock bin, therefore the shafting assembly and the turntable assembly can be disassembled, so that the maintenance or replacement of the turntable assembly is achieved, and it is convenient to maintain the turntable assembly.

In the unloading device provided by the present application, the first bearing and the second bearing of the shafting assembly are respectively placed in the withdrawal bearing bush. Through the disassembly of the withdrawal bearing bush, the first bearing and the second bearing can be conveniently disassembled and assembled. The replacement and maintenance are simple, and no special tooling is needed.

Through the cooperation between the guard plate assembly, the turntable assembly and the disturbance mechanism, the unloading device provided by the present application ensures the reclaiming reliability of the spherical materials and the stability of the sphere flow unloading.

| | |
|---|---|
| 1 power mechanism | 2 transmission mechanism |
| 3 execution mechanism | 4 pressure-bearing casing assembly |
| 5 turntable assembly | 6 guard plate assembly |
| 7 disturbance mechanism | 8 coupling support |
| 9 first fastener | 10 first sealing element |
| 11 casing | 12 lining cylinder |
| 13 sphere outlet adapter pipe | 14 end flange |
| 15 bearing sleeve | 16 unloading function area |
| 17 stock bin | 18 tapered surface chamber |
| 19 vertical cylindrical cavity | 20 reclaiming slot |
| 21 connector | 22 lower reclaiming portion |
| 23 thrust bearing | 24 withdrawal bearing bush |
| 25 first bearing | 26 second bearing |
| 27 first shaft sleeve | 28 second fastener |
| 29 second shaft sleeve | 30 third shaft sleeve |
| 31 main shaft | 32 upper auxiliary fence |
| 33 middle main disturbance disk | 34 scraper |
| 35 reclaiming ring | 36 spacer rib |
| 37 inner baffle ring | 38 arc-shaped surface |
| 39 disturbance block | 40 circular segment |
| 41 tangent plane | 42 bottom arc plate |
| 43 insert bar assembly | 44 material outlet |
| 45 material guide bevel | 46 bottom arc surface |
| 47 top plane | 48 material guide groove |
| 49 positioning boss | 50 insert bar |
| 51 gantry | 52 side baffle |
| 53 reclaiming port | 54 spherical material |
| 55 direct-acting permanent magnet drive mechanism | |
| 100 driving line | 200 hermetic space |
| 300 shafting assembly | |

DETAILED DESCRIPTION

In order to make the objectives, technical solutions, and advantages of the embodiments of the present application clearer, the technical solutions of the embodiments of the present application will be clearly and completely described with reference to the accompanying drawings of the embodiments of the present application. Obviously, the described embodiments are part but not all of the embodiments of the present application. Based on the embodiments of the present application, all other embodiments obtained by a person of ordinary skill in the art without creative efforts shall fall within the protection scope of the present application.

Figure 1:
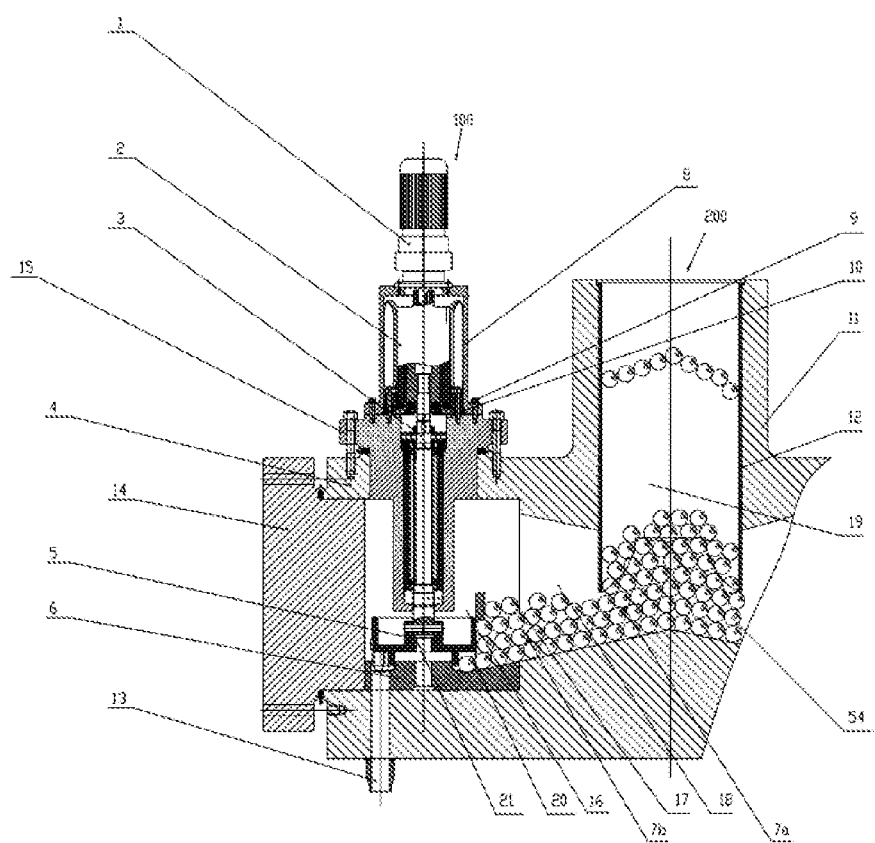
FIG. 1 is a front view of the unloading device according to an embodiment of the present application.
Figure 2:
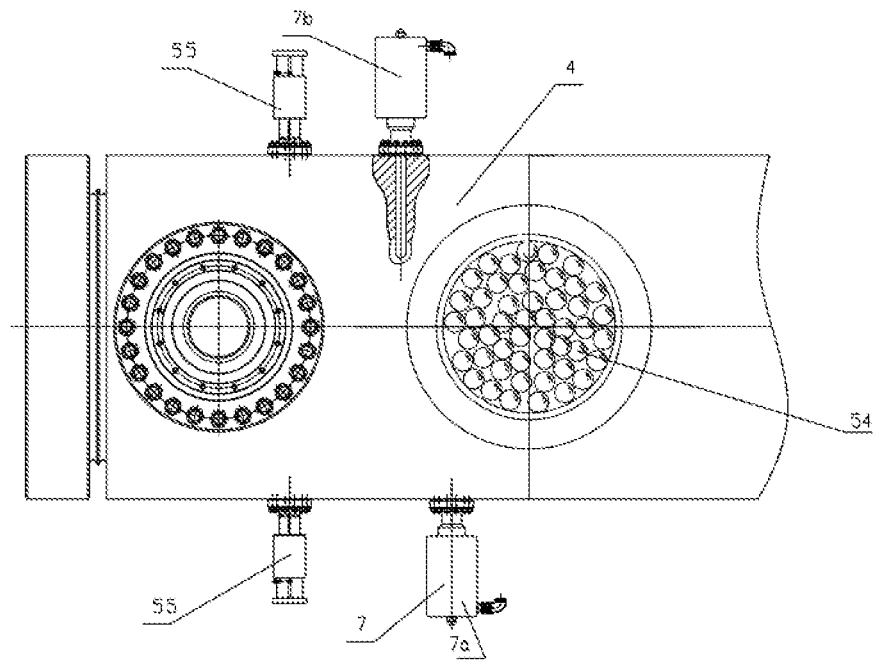
FIG. 2 is a top view of the unloading device in FIG. 1 according to an embodiment of the present application.
Figure 3:
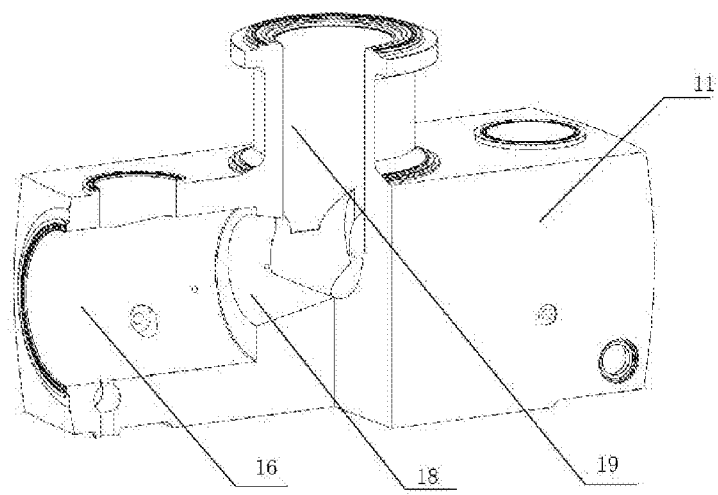
FIG. 3 is a 3D structural diagram of a pressure-bearing casing assembly in the unloading device according to an embodiment of the present application.
Figure 4:
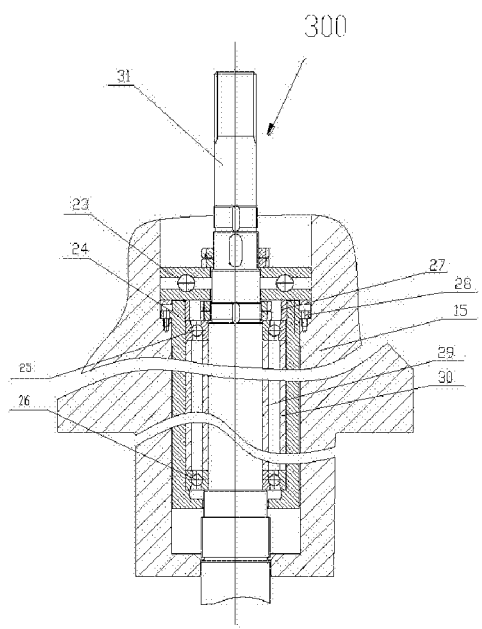
FIG. 4 is a structural schematic diagram of a shafting assembly in the unloading device according to an embodiment of the present application.
Figure 5:
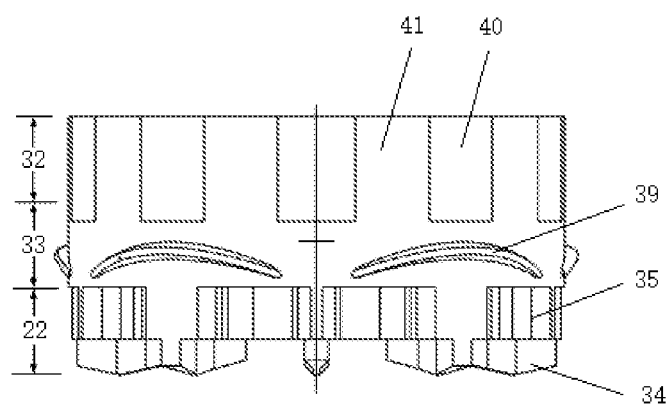
FIG. 5 is a front view of a turntable assembly in the unloading device according to an embodiment of the present application.
Figure 6:
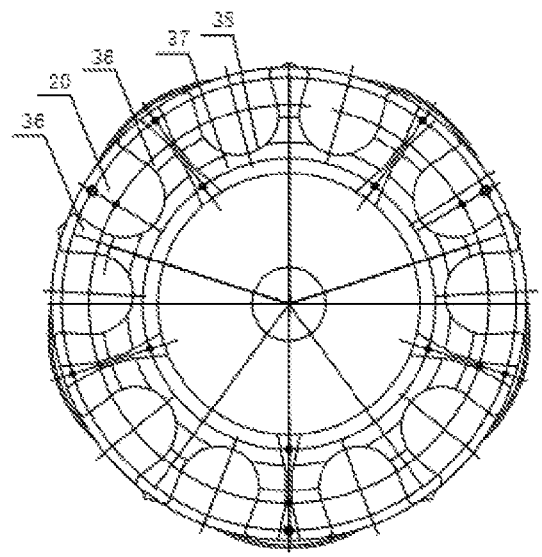
FIG. 6 is a structural schematic diagram of the bottom of a turntable assembly in the unloading device according to an embodiment of the present application.
Figure 7:
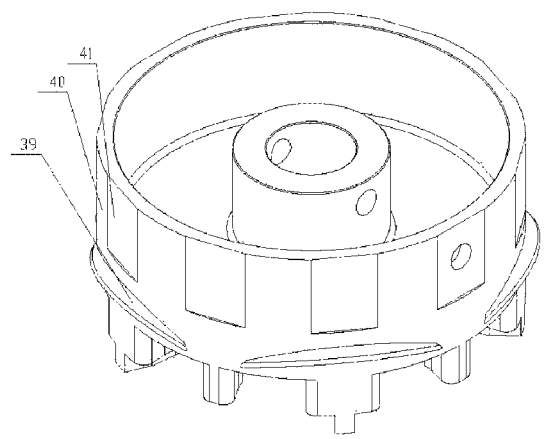
FIG. 7 is an axonometric diagram of a turntable assembly in the unloading device according to an embodiment of the present application.
Figure 8:
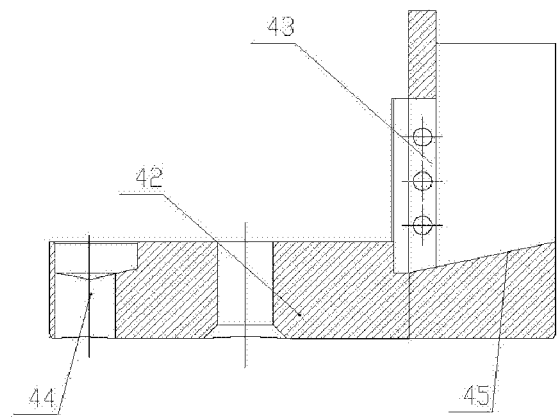
FIG. 8 is a structural diagram of a guard plate assembly in the unloading device according to an embodiment of the present application.
Figure 9:
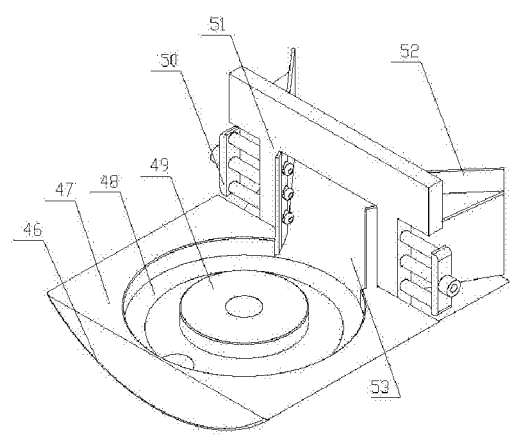
FIG. 9 is an installation diagram of a guard plate assembly and an insert bar assembly in the unloading device according to an embodiment of the present application.

As shown in FIG. 1 to FIG. 9, the embodiments of the present application provide an unloading device, including a power mechanism 1, a transmission mechanism 2, an execution mechanism 3, a pressure-bearing casing assembly 4, a guard plate assembly 6 and a disturbance mechanism 7.

The power mechanism 1 includes a motor and a speed reducer connected to the motor.

The transmission mechanism 2 is a coupling. One end of the transmission mechanism 2 is connected to the power mechanism 1, and the other end thereof is connected to the execution mechanism 3. The power mechanism 1, the transmission mechanism 2 and the execution mechanism 3 are detachably connected in sequence to form a vertical driving line 100.

The execution mechanism 3 includes a shafting assembly 300 and a turntable assembly 5 connected in sequence from top to bottom. The shafting assembly 300 is connected to the turntable assembly 5 through a connector 21.

The pressure-bearing casing assembly 4 includes a casing 11 and an end flange 14, a bearing sleeve 15 that are respectively connected to the casing 11. A bottom of the casing 11 is provided with a sphere outlet adapter pipe 13.

In a preferable embodiment, the transmission mechanism 2 is a magnetic transmission. A coupling support 8 is arranged outside the transmission mechanism 2. The coupling support 8 is connected to the bearing sleeve 15 through a first fastener 9. A first sealing element 10 is provided between the coupling support 8 and the bearing sleeve 15 which is connected to the pressure-bearing casing assembly 4.

An inner cavity of the pressure-bearing casing assembly 4 is a hermetic space 200. The non-contact transmission characteristic of the magnetic transmission is used to convert the dynamic seal of the execution mechanism 3 into a static seal to ensure zero atmosphere leakage in the hermetic space 200.

The guard plate assembly 6 is installed in the pressure-bearing casing assembly 4, and disposed below the driving line 100, that is, the guard plate assembly 6 is disposed at the bottom of the turntable assembly 5. The guard plate assembly 6 divides the inner cavity of the casing 11 into two parts, namely a stock bin 17 and an unloading function area 16. Spherical materials 54 are temporarily stored in a vertical cylindrical cavity 19 and a tapered surface chamber 18. The area where the tapered surface chamber 18 and the guard plate assembly 6 are connected is the stock bin 17. The unloading function area 16 is a horizontal cylindrical chamber. The turntable assembly 5 and the guard plate assembly 6 are located inside the unloading function area 16 and collectively perform a singular unloading function.

The inner cavity of the casing 11 of the pressure-bearing casing assembly 4 includes an unloading function area 16, a tapered surface chamber 18 and a vertical cylindrical cavity 19. A lining cylinder 12 is installed in the vertical cylindrical cavity 19. A lower portion of the lining cylinder 12 extends into the tapered surface chamber 18, and the lower portion of the lining cylinder 12 is provided with a shovel-shaped cambered surface baffle. When the spherical materials 54 are filled in the vertical cylindrical cavity 19, due to the blocking effect of the shovel-shaped cambered surface baffle, and based on the principle of fluid pressure, the unloading function area 16, the tapered surface chamber 18 and the vertical cylindrical cavity 19 form a communicating vessel, and the pressure of the sphere column in the vertical cylindrical cavity 19 will push the spherical materials 54 to flow toward the tapered surface chamber 18 and the unloading function area 16. Due to the blocking of the turntable assembly 5 and the guard plate assembly 6, the sphere flow forms a liquid-like free stacking surface at the unloading function area 16, and the height of the free stacking surface basically flushes with the bottom of the shovel-shaped cambered surface baffle.

In this embodiment, the turntable assembly 5 includes an upper auxiliary fence 32, a middle main disturbance disk 33, and a lower reclaiming portion 22 that are arranged in sequence from top to bottom. The upper auxiliary fence 32, the middle main disturbance disk 33, and the lower reclaiming portion 22 correspond to three layers of materials from bottom to top.

The lower reclaiming portion 22 includes a reclaiming ring 35 and an inner baffle ring 37 provided in the reclaiming ring 35. The reclaiming ring 35 includes a plurality of spacer ribs 36 arranged annularly. The bottom of each of the spacer ribs 36 is connected to the inner baffle ring 37 through a scraper 34. Arc-shaped surfaces 38 are provided at the reclaiming positions of the inner baffle ring 37. A reclaiming slot 20 is formed between each adjacent two of the spacer ribs 36 and the inner baffle ring 37. In this embodiment, two kinds of spacer ribs with different widths are used to introduce asymmetry to the reclaiming slot 20, so as to disturb the bottom spherical material 54.

A plurality of disturbance blocks 39 having irregular shapes are arranged on an outer surface of the middle main disturbance disk 33 so as to disturb the spherical materials 54 of the middle layer in the height and diameter directions, thereby ensuring the reclaiming flexibility and reliability of the spherical materials 54 of the bottom layer.

An outer surface of the upper auxiliary fence 32 is formed by smoothly transition-connecting several circular segments 40 and tangent planes 41. The spherical materials 54 of the upper layer in the stock bin 17 is directly disturbed by this transitional fluctuant curved surface structure.

In this embodiment, the disturbance effects of the triple disturbance structure of the upper auxiliary fence 32, the middle main disturbance disk 33, and the lower reclaiming portion 22 on the spherical materials 54 in the stock bin 17 are integrated. Through the motion transmission, the flow of the spherical material 54 can be guaranteed uniform, which ensures the reliable reclaiming by the reclaiming slot 20.

In this embodiment, upon the pressure of the sphere column in the vertical cylindrical cavity 19, the loosely accumulated spherical materials 54 flow into the stock bin 17 through the lining cylinder 12. When the power mechanism 1 drives the execution mechanism 3 to rotate through the transmission mechanism 2, the pressure of the sphere column pushes the spherical materials 54 into the reclaiming slot 20 of the turntable assembly 5, so that the spherical materials 54 rotate, with the main disturbance disk 33, into the sphere outlet adapter pipe 13, and the spherical materials 54 are discharged from the unloading device by gravity.

Since the turntable assembly 5 has a plurality of reclaiming slots 20, the execution mechanism 3 can take a plurality of spherical materials 54 in each revolution, and then the spherical materials 54 are discharged into the sphere outlet adapter pipe 13 through a material outlet 44 to complete the unloading operation of the spherical materials 54. However, due to the solid material characteristics of the spherical materials 54, and influence of the structures of the guard plate assembly 6, the casing 11, the lining cylinder 12 and etc., influence of the material impacts such as the apparent shape of each spherical material 54, damage fuel and debris, and influence of the torque, rotate speed and etc. of the execution mechanism 3, it cannot be ensured that each reclaiming slot 20 can take a spherical material 54 when feeding is performed through the stock bin 17. In some cases, the spherical materials 54 may be temporarily squeezed, or are arched in the stock bin 17, so that the spherical materials 54 cannot enter the reclaiming slot 20. Frequent empty reclaiming of the reclaiming slot 20 will not only affect the unloading efficiency, but also is not beneficial to the automatic control of the reclaiming. Therefore, through the disturbance function of the three-layer functional sections of the upper auxiliary fence 32, the middle main disturbance disk 33, and the lower reclaiming portion 22 provided in sequence from top to bottom of the turntable assembly 5, the problem of empty reclaiming of the material can be solved, thereby improving the sphere reclaiming rate.

The guard plate assembly 6 includes a bottom arc plate 42 and an insert bar assembly 43 provided on the bottom arc plate 42. The bottom arc plate 42 is connected to the tapered surface chamber 18 through a material guide bevel 45, and the insert bar assembly 43 is provided between the bottom arc plate 42 and the material guide bevel 45.

An upper surface of the bottom arc plate 42 is a top plane 47, and a lower surface of the bottom arc plate 42 is a bottom arc surface 46. A material guide groove 48 is provided on the top plane 47, and a positioning boss 49 is provided in the material guide groove 48. The bottom arc plate 42 is mounted on the bottom of the unloading function area 16 of the casing 11 through the positioning boss 49, and the bottom arc surface 46 is attached with the unloading function area 16 in an isodiametric manner.

The insert bar assembly 43 includes a gantry 51, two insert bars 50 correspondingly and movably connected to the left and right sides of the gantry 51 respectively, and two side baffles 52 symmetrically disposed on the left and right sides of the gantry 51. The gantry 51 is provided with a reclaiming port 53. In this embodiment, insert pins of each insert bar 50 can be movably connected to the gantry 51 by penetrating the side plates of the gantry 51. The relative movement of the two insert bars 50 can close the reclaiming port 53, and the opposite movement of the two insert bars 50 can open the reclaiming port 53. The two side baffles 52 are provided in a tapered shape. The material guide bevel 45, the two side baffles 52, the reclaiming port 53 and the bottom arc plate 42 together form a reclaiming material path for the turntable assembly 5, and the material guide groove 48 on the bottom arc plate 42 can ensure the smooth flow of the spherical materials 54, dust and etc. under be guide of the reclaiming slot 20 and the scraper 34. The positioning boss 49 facilitates the installation of the guard plate assembly 6 and can limit the turntable assembly 5 at the same time. The gantry 51 and the bottom arc plate 42 can effectively block three or more layers of the spherical material 54 in the stock bin 17 without forming an additional pressing load against the turntable assembly 5.

When the turntable assembly 5 fails to discharge spheres for a long time, it can be determined through control logic that the stock bin 17 is arched. Due to the structural characteristics of the spherical material 54 and the stock bin 17, the arching phenomenon may occur in three positions: a position near the shovel-shaped cambered surface baffle of the lining cylinder 12, a possibly formed arching in the height direction at the gantry 51 of the insert bar assembly 43 when the spherical material 54 accumulated in the stock bin 17 exceeds the upper auxiliary fence 32, and the circumferential arc length on the bottom arc plate 42 near the reclaiming port 53.

The occurrence probability of the above-mentioned three types of bridging increases in order. In order to remove the bridging so as to ensure the normal unloading of the core, the disturbance mechanism 7 is used in this embodiment to solve the problem. The disturbance mechanism 7 includes an electromagnetically drive push rod 7a and an electromagnetically drive mechanism 7b. As a linear drive mechanism, the electromagnetically drive push rod 7a can solve the problem of arch breakage in the case of the first bridging. For the second and third bridging, the bridge can be broken by the electromagnetically drive mechanism 7b.

It's assumed that the turntable assembly in this embodiment is provided with ten reclaiming slots 20, and one spherical material 54 is reclaimed for an average of 20 seconds. According to this sphere reclaiming probability, if the counter provided downstream of the unloading device fails to reclaim the spherical materials 54 within 2 consecutive minutes, it can be determined that the third or the second bridging may occur. Therefore, the electromagnetically drive mechanism 7b is firstly started to break the bridge. If the spherical material 54 is still not reclaimed, it is determined that the first bridging may occur, and at this time, the electromagnetically drive push rod 7a may be started to break the bridge.

In this embodiment, the bearing sleeve 15 of the pressure-bearing casing 4 is connected to the casing 11.

The shafting assembly 300 in the execution mechanism 3 includes a main shaft 31, a first bearing 25, a second bearing 26, a withdrawal bearing bush 24, and a thrust bearing 23. The first bearing 25 and the second bearing 26 are respectively installed on the main shaft 31 from top to bottom. The first bearing 25 and the second bearing 26 are spaced by a second shaft sleeve 29 and a third shaft sleeve 30, and the first bearing 25 and the second bearing 26 are both disposed in the withdrawal bearing bush 24. The thrust bearing 23 is mounted on the main shaft 31 and disposed at an upper part of the withdrawal bearing bush 24. A bottom surface of the thrust bearing 23 abuts against the first shaft sleeve 27, and the thrust bearing 23 bears against the first bearing 25 through the first shaft sleeve 27. The withdrawal bearing bush 24 is installed in the bearing sleeve 15 through a second fastener 28.

In this embodiment, the thrust bearing 23 mainly bears the self-weight load of the shafting assembly 300. The first bearing 25 and the second bearing 26 play an auxiliary supporting role on the shafting assembly 300, and bear the torque generated by the pressing force and friction force of the pebble bed in the stock bin 17. The first bearing 25, the second bearing 26 and the thrust bearing 23 jointly ensure the operational stability of the shafting assembly 300.

Since the first bearing 25 and the second bearing 26 are both placed in the withdrawal bearing bush 24, after the uppermost thrust bearing 23 is disassembled, the first bearing 25 and the second bearing 26 can be easily disassembled and assembled with a puller by disassembling and assembling the withdrawal bearing bush 24. The replacement and maintenance are simple, and no special tooling is required.

In this embodiment, two direct-acting permanent magnet drive mechanisms 55 are also provided. The two direct-acting permanent magnet drive mechanisms 55 respectively push the two insert bars 50 to close the gantry 51 so as to block the radioactive spherical materials 54 in the stock bin 17, thereby integrally disassembling the shafting assembly 300 and the turntable assembly 5 for maintenance and replacement by extracting the bearing sleeve 15.

In summary, the unloading device described in the embodiments of the present application can fully disturb the spherical materials in the stock bin in the circumferential, radial, and height directions, achieve the adaptive and efficient reclaiming, and ensure the reclaiming reliability of the spherical materials and the stability of the sphere flow unloading.

In the description of the present application, it should be noted that, the terms "connected with" and "connected to" should be understood in a broad sense unless otherwise specified and limited, for example, they may be fixed connections, detachable connections, or integrated connections; they can be mechanical connections or electrical connections; they can be direct connections or indirect connections through intermediate mediums. For those of ordinary skill in the art, the specific meanings of the above terms in this application can be understood according to specific situations.

In the description of the present application, unless otherwise stated, "several" means one or more; "multiple" means two or more. The orientation or position relations indicated by the terms "upper", "lower", "left", "right", "inner", "outer" and etc. are based on the orientation or position relations shown in the drawings, and are only for the convenience of describing the present application and simplifying the description, rather than indicating or implying that the referred device or element must have a specific orientation, be constructed and operated in a specific orientation, and therefore cannot be understood as limiting the present application.

Finally, it should be noted that the embodiments above are only used to illustrate rather than limit the technical solutions of the present application. Although the present application has been described in detail with reference to the foregoing embodiments, those of ordinary skills in the art should understand that they can still modify the technical solutions described in the various embodiments above, or equivalently replace some of the technical features thereof; and these modifications or replacements do not depart the essence of the corresponding solutions from the spirit and scope of the technical solutions of the various embodiments of the present application.

The invention claimed is:

1. An unloading device, comprising:
a power mechanism, a transmission mechanism, and an execution mechanism that are connected in sequence from top to bottom; wherein the execution mechanism comprises a shafting assembly and a turntable assembly that are connected in sequence from top to bottom; wherein the turntable assembly comprises an upper auxiliary fence, a middle main disturbance disk, and a lower reclaiming portion that are arranged in sequence from top to bottom,
wherein a bottom of the turntable assembly is provided with a guard plate assembly,
wherein the guard plate assembly comprises a bottom arc plate and an insert bar assembly provided on the bottom arc plate; the bottom arc plate is connected to a tapered surface chamber, and the insert bar assembly is arranged between the bottom arc plate and the tapered surface chamber.

2. The unloading device of claim 1, wherein the insert bar assembly comprises a gantry, two insert bars correspondingly and movably connected to left and right sides of the gantry respectively, and two side baffles symmetrically disposed on the left and right sides of the gantry; the gantry is provided with a reclaiming port.

3. The unloading device of claim 1, wherein the lower reclaiming portion comprises a reclaiming ring and an inner baffle ring provided in the reclaiming ring; the reclaiming ring comprises a plurality of spacer ribs arranged annularly, and each of the spacer ribs is connected to the inner baffle ring; a reclaiming slot is formed between each adjacent two of the spacer ribs and the inner baffle ring.

4. The unloading device of claim 1, wherein a plurality of disturbance blocks are provided on an outer side surface of the middle main disturbance disk.

5. The unloading device of claim 1, wherein the upper auxiliary fence is formed by circular segments and tangent planes that are arranged at intervals.

6. The unloading device of claim 1, wherein the shafting assembly comprises a main shaft, a first bearing, a second bearing, a withdrawal bearing bush, and a thrust bearing; the first bearing and the second bearing are respectively installed on the main shaft from top to bottom; the first bearing and the second bearing are both arranged in the withdrawal bearing bush; the thrust bearing is mounted on the main shaft and arranged on an upper portion of the withdrawal bearing bush.

7. The unloading device of claim 1, wherein the device further comprises a pressure-bearing casing assembly; an upper end and a lower end of the transmission mechanism are detachably connected to the power mechanism and the execution mechanism respectively; a coupling support is arranged outside the transmission mechanism, and the coupling support is connected to a bearing sleeve connected to the pressure-bearing casing assembly.

8. The unloading device of claim 7, wherein disturbance mechanisms are provided on the pressure-bearing casing assembly, and the disturbance mechanisms are linear reciprocating drive mechanisms.

* * * * *